(12) United States Patent
Wolkowicz et al.

(10) Patent No.: US 11,574,004 B2
(45) Date of Patent: Feb. 7, 2023

(54) VISUAL IMAGE SEARCH USING TEXT-BASED SEARCH ENGINES

(71) Applicant: Dash Hudson, Halifax (CA)

(72) Inventors: Jacek Wolkowicz, Halifax (CA); Tomasz Niewiarowski, Halifax (CA)

(73) Assignee: Dash Hudson, Halifax (CA)

( * ) Notice: Subject to any disclaimer, the term of this patent is extended or adjusted under 35 U.S.C. 154(b) by 293 days.

(21) Appl. No.: 16/696,561

(22) Filed: Nov. 26, 2019

(65) Prior Publication Data

US 2021/0157833 A1   May 27, 2021

(51) Int. Cl.
| | |
|---|---|
| *G06F 7/00* | (2006.01) |
| *G06F 16/583* | (2019.01) |
| *G06K 9/62* | (2022.01) |
| *G06F 16/532* | (2019.01) |
| *G06F 16/2457* | (2019.01) |
| *G06F 16/11* | (2019.01) |
| *G06F 16/56* | (2019.01) |
| *G06F 16/953* | (2019.01) |

(52) U.S. Cl.
CPC ........ *G06F 16/5846* (2019.01); *G06F 16/116* (2019.01); *G06F 16/24578* (2019.01); *G06F 16/532* (2019.01); *G06F 16/56* (2019.01); *G06F 16/5854* (2019.01); *G06F 16/953* (2019.01); *G06K 9/623* (2013.01); *G06K 9/6247* (2013.01)

(58) Field of Classification Search
CPC .. G06F 16/1844; G06F 16/532; G06F 16/901; G06F 16/5838; G96F 16/313
See application file for complete search history.

(56) References Cited

U.S. PATENT DOCUMENTS

| | | | | |
|---|---|---|---|---|
| 5,325,297 A | * | 6/1994 | Bird | G06F 16/40 715/201 |
| 5,742,815 A | * | 4/1998 | Stern | G06F 16/5846 707/E17.022 |
| 5,799,325 A | * | 8/1998 | Rivette | G06F 13/4063 715/209 |
| 5,809,318 A | * | 9/1998 | Rivette | G06F 13/4063 715/202 |
| 5,896,462 A | * | 4/1999 | Stern | G06F 16/5846 707/E17.022 |

(Continued)

FOREIGN PATENT DOCUMENTS

| | | | |
|---|---|---|---|
| EP | 1917636 A1 | * | 12/2008 |
| WO | WO2014131447 A1 | * | 9/2014 |

OTHER PUBLICATIONS

Stamkopoulos et al. "ECG Analysis Using Nonliner PCA Neural Networks for Ischemia Detection", IEEE 1998.*

*Primary Examiner* — Daniel A Kuddus
(74) *Attorney, Agent, or Firm* — Polsinelli PC

(57) ABSTRACT

The present technology analyzes the content of images to create complex representations of the images and then reduces the complexity of these representations into a size that is both suitable for comparison but also contains critical image descriptive aspects. These reduced complexity representations can then be used to efficiently search for similar images. Moreover, the reduced complexity representations are formatted such that they can take advantage of existing text search engines, which are well suited to efficiently searching through a large number of unique results.

18 Claims, 6 Drawing Sheets

(56) References Cited

U.S. PATENT DOCUMENTS

| | | | | |
|---|---|---|---|---|
| 5,991,780 A * | 11/1999 | Rivette | ............... | G06F 13/4063 |
| | | | | 715/255 |
| 7,398,269 B2 * | 7/2008 | Shanahan | ............. | G06F 16/337 |
| | | | | 707/754 |
| 8,589,457 B1 * | 11/2013 | Bengio | ............ | G06F 16/24578 |
| | | | | 707/913 |
| 9,043,316 B1 * | 5/2015 | Murphy-Chutorian | ....................... | |
| | | | | G06V 10/40 |
| | | | | 707/723 |
| 9,171,502 B2 * | 10/2015 | Tomida | ................ | G09G 3/3225 |
| 10,755,039 B2 * | 8/2020 | Rodriguez | ............ | G06F 40/103 |
| 2003/0191766 A1 * | 10/2003 | Elin | ...................... | G06F 16/748 |
| | | | | 707/E17.031 |
| 2004/0172378 A1 * | 9/2004 | Shanahan | ............. | G06F 16/337 |
| 2006/0136402 A1 * | 6/2006 | Lee | ...................... | G06F 16/2465 |
| 2007/0050411 A1 * | 3/2007 | Hull | ...................... | G06F 16/434 |
| 2008/0056538 A1 * | 3/2008 | Frank | .................... | G06F 16/338 |
| | | | | 382/113 |
| 2008/0177640 A1 * | 7/2008 | Gokturk | ............ | G06Q 30/0603 |
| | | | | 705/26.62 |
| 2009/0228777 A1 * | 9/2009 | Henry | ..................... | G06F 16/40 |
| | | | | 715/230 |
| 2011/0072012 A1 * | 3/2011 | Ah-Pine | .................. | G06F 16/54 |
| | | | | 707/723 |
| 2013/0060786 A1 * | 3/2013 | Serrano | .................. | G06V 20/63 |
| | | | | 707/E17.03 |
| 2015/0302084 A1 * | 10/2015 | Stewart | ................. | G06F 16/358 |
| | | | | 707/776 |
| 2016/0004928 A1 * | 1/2016 | Blanchflower | ........ | G06T 1/0007 |
| | | | | 707/756 |
| 2016/0140147 A1 * | 5/2016 | Sun | ..................... | G06F 16/5854 |
| | | | | 707/772 |
| 2016/0350886 A1 * | 12/2016 | Jessen | .................... | G06Q 10/10 |
| 2019/0080351 A1 * | 3/2019 | Garg | ................... | G06Q 30/0253 |
| 2019/0236102 A1 * | 8/2019 | Wade | .................... | G06F 40/205 |
| 2019/0286898 A1 * | 9/2019 | Powell | ................... | G06F 16/22 |
| 2020/0159820 A1 * | 5/2020 | Rodriguez | ............ | G06F 40/137 |

* cited by examiner

VISUAL IMAGE SEARCH USING TEXT-BASED SEARCH ENGINES

TECHNICAL FIELD

The present technology pertains to visual image search and more specifically pertains to utilizing a text-based search engine to search for images based on their visual content.

BACKGROUND

Most technologies that attempt to perform text-based image searches generally use file names and metadata associated with the images to find relevant images, but this approach requires quality file names and metadata. Some techniques appears to search for images based on image content, but search approaches utilize incredible amounts of computing power, and is not practical for most use cases and does not account for the fact that internet image content that is being generated at a faster pace than ever making the search space ever larger. Moreover, approaches are not efficient enough to satisfy the need to search images quickly and in a large scale.

BRIEF DESCRIPTION OF THE DRAWINGS

In order to describe the manner in which the above-recited and other advantages and features of the disclosure can be obtained, a more particular description of the Principals briefly described above will be rendered by reference to specific embodiments thereof which are illustrated in the appended drawings. Understanding that these drawings depict only exemplary embodiments of the disclosure and are not therefore to be considered to be limiting of its scope, the Principals herein are described and explained with additional specificity and detail through the use of the accompanying drawings in which.

DETAILED DESCRIPTION

Figure 1:
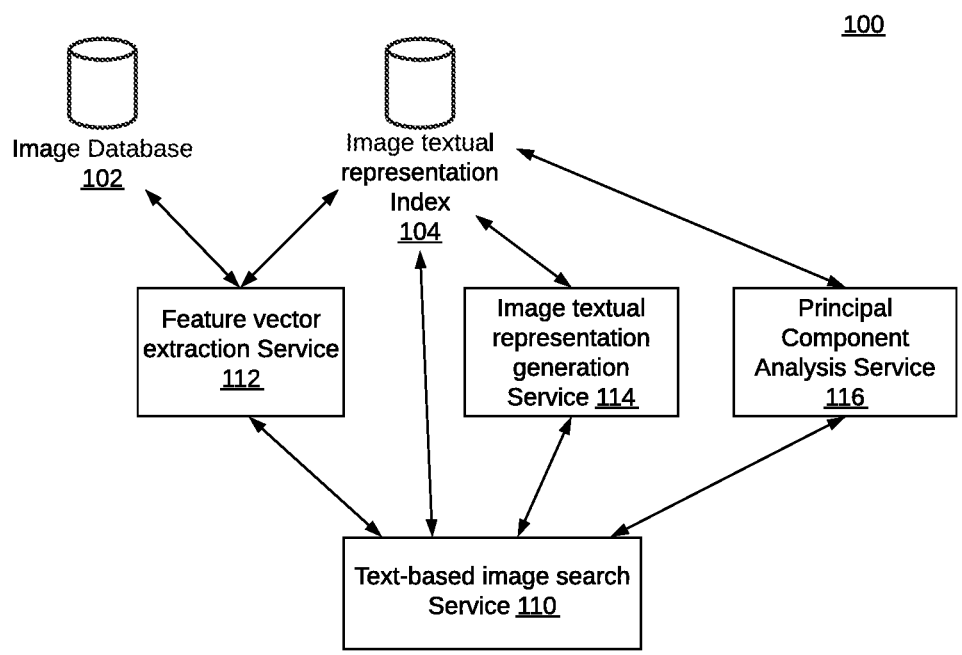
FIG. 1 illustrates an example system for performing text-based image search in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for text-based image search and more specifically utilizing a text-based search engine to search for images based on their content. Text-based image search based on image content using traditional search engines is a tough technical challenge owing in part to the fact that image file names and metadata is often not descriptive enough of image content or curated well enough. As such, searching for images using this technique does not provide good search results.

Recently image search engines have come to exist wherein images can be searched based on an image as a search string. These images search engines are characterized by using unreasonably large amounts of computing power. As such, searching for images using this technique is not practical for most uses or by most entities.

The present technology addresses the above needs in the art by analyzing the content of images to create complex representations of the images and then reducing the complexity of these representations into a size that is both suitable for comparison but also contains critical image descriptive aspects. These reduced complexity representations can then be used to efficiently search for similar images. Moreover, the reduced complexity representations are formatted such that they can take advantage of existing text search engines, which are well suited to efficiently searching through a large number of unique results. The present technology utilizes an efficient text search method based on Zipf's law in the image search, which prioritizing searching a database for the less frequently occurring search terms. By searching based on the less frequently occurring terms in the query first, this search method narrows down the possible result set much faster than simply searching each word in another order.

Specifically, the disclosed technology can receive a first image file as a search input, and convert the first image file into a textual representation of the first image file. The present technology can search for other similar textual representations of other images in a database using a text-optimized search engine.

Additional features and advantages of the disclosure will be set forth in the description which follows, and in part will be obvious from the description, or can be learned by practice of the herein disclosed Principals. The features and advantages of the disclosure can be realized and obtained by means of the instruments and combinations particularly pointed out in the appended claims. These and other features of the disclosure will become more fully apparent from the following description and appended claims or can be learned by the practice of the Principals set forth herein.

FIG. 1 illustrates an example system for text-based image search (100) in accordance with some aspects of the present technology. The system 100 includes image database 102 that is configured to store image files, where at least some of the image files include the same image content as other images. The images could have been collected directly from digital cameras (including smartphones) or scanners, or can be harvested from Internet websites such as social media websites like INSTAGRAM and FACEBOOK.

FIG. 1 also illustrates image textual representation index 104. Image textual representation index 104 is configured to store one or more textual representations (alphanumeric strings, vectors, etc.) that are descriptive of the images in image database 102. Image textual representation textual index 104 can also include a reference or pointer to an image in image database 102.

In some embodiments, image database 102 and image textual representation index 104 can be the same database.

In some embodiments, image database 102 and image textual representation index 104 can be stored on the same physical or virtual disk.

The system 100 also includes a text-based image search service 110, which is configured to convert images in image database 102 into one or more textual representations and to compare textual representations of the search input with the collection of images to detect images that have relevant textual representations. In some embodiments, text-based image search service 110 can coordinate with feature vector extraction service 112, image textual representation generation service 114, and Principal Component Analysis Service 116 to generate the one or more textual representations from the extracted image feature vectors.

Feature vector extraction service 112 can be any tool configured to analyze image content of an image file and output an alphanumeric representation or vector representation of the content of the image file. A suitable technique can be employed by some image analysis artificial intelligence platforms. For example, convolutional neural networks can be trained to analyze image content and output representations that can be input into classifiers to identify objects in images. In such systems the output of the convolutional neural network can be a high-dimensional representation of the content of the image. Such high-dimensional representation can be about 2048 bits of image feature vectors for each image. Each image feature vector identifies specific content characteristics of images, thus such image feature vectors can be used to generate a content specific textual representation of images.

An example of a feature vector extraction service is GOOGLE INCEPTION deep neural network. In some embodiments, the feature vector is received from the feature vector extraction service 112. Such an output from the feature vector extraction service 112 can include over 2048 bits and is a specific representation of the image based on its content. In some embodiments, the feature vector might not be the final output of the feature vector extraction service and instead the feature vector might be an intermediate representation of the image that feature vector extraction service 112 might use for some other purposes.

In some embodiments, the feature vector received from feature vector extraction service 112 is a high dimensional representation of the content of an image. Such high dimensional representation can include over 2048 bits of data and as such might be too large to provide direct comparisons between images. In such embodiments, it can be useful to perform a Principal Component Analysis (PCA) on the high dimensional representation to determine which dimensions of the high dimensional representation are the most important in comparing image content to other images, and then reduce the dimensionality of the representation and convert them into searchable textual representations of the image for text-based search engines.

Principal Component Analysis service 116 can be used to perform the Principal Component Analysis on the high dimensional feature vectors. An output of the Principal Component Analysis can be a scoring of how important a dimension of high dimensional representation is in comparing content of images. The dimensions having the highest absolute value scores (the most important) can be selected, and these dimensions can be used to create a reduced dimensionality representation of the images. Principal Component Analysis service 116 and its functions are addressed in greater detail with respect to FIG. 3, below.

Image textual representation generation service 114 can be used to reduce the dimensionality of the representation and convert them into searchable textual representations. Image textual representation generation service 114 and its functions are addressed in greater detail with respect to FIG. 3, below.

Further details pertaining to the components of system 100 will be addressed below. FIGS. 2-6 will be addressed with reference to FIG. 1. While these figures may be discussed with reference to each other, such references should not be considered limiting of the present technology.

While the entities represented herein, such as in FIG. 1, have been referred to as separate entities, this is for example purposes. While in some embodiments, the entities in FIG. 1 can be provided by different servers and organizations, they can also all be performed by the same server or by the same organization on a network of devices and machines, whether real or virtual. As such, the division of such entities should not be considered limiting unless specifically enumerated in the claims appended hereto.

Likewise, the steps in the processes shown herein are all for example purposes, and these steps can be combined or executed in a different order, as will be apparent to those of ordinary skill in the art.

Figure 2:
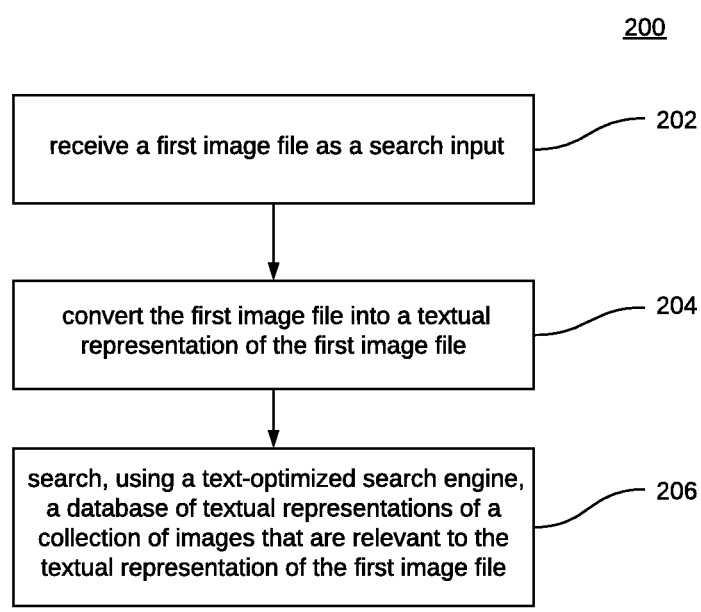
FIG. 2 illustrates an example method for image searching using content based textual representations in accordance with some aspects of the present technology.

FIG. 2 illustrates an example method 200 of image searching using content-based textual representations in accordance with some aspects of the present technology. Method 200 can begin when text-based image search Service 110 receives a first image file as a search input (202). However, the search input is not limited to one image file. In some embodiments, a collection of multiple images can be received together as a search input, and the search result will be images that have similar content to the collection of multiple input images.

Text-based image search service 110 coordinates with image textual representation generation service 114 to convert the input first image file into a textual representation of the first image file (204). In some embodiments, the textual representation includes alphanumeric characters or symbols that can be used in a search query in a text-based search engine. In some embodiments, when the search input is a collection of multiple images, the conversion result will be a collection of textual representations of the images. The conversion (204) process by image textual representation generation service 114 is addressed in greater detail with respect to FIG. 3, below.

Text-based image search service 110 then uses a text-optimized search engine to search a database of textual representations of a collection of images (206). This search is to identify images that have similar content as the first image by identifying textual representations associated with the collection of images that are similar to the textual representation of the first image. The text-based image search service 110 and the search process are addressed in greater detail with respect to FIGS. 4 and 5, below.

Figure 3:
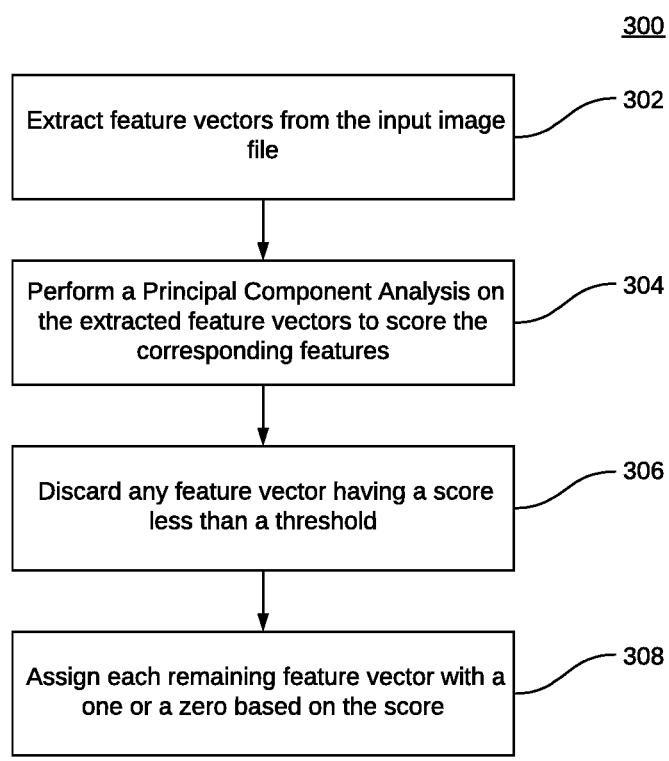
FIG. 3 illustrates an example method for converting an image file into a textual representation in accordance with some aspects of the present technology.

FIG. 3 illustrates an example method of converting the input image file into a textual representation in accordance with some aspects of the present technology (300). The text-based image search service 110 can coordinate with the feature vector extraction service 112 to extract feature vectors from the input first image file (302). In some embodiments, a neural network service trained to provide the feature vectors descriptive of image content can be used. One example is GOOGLE'S INCEPTION deep neural network. This process of converting includes, but is not limited to, creating an approximately 2048 bit content based feature vector for each image.

As addressed above, the 2048 bit feature vector can be highly descriptive of the image, but many of the feature vectors are more specific than is necessary for the present analysis. Additionally, comparisons of the approximately 2048 bit feature vectors can be computationally intensive for text-based search engines to process. Accordingly, a Principal Component Analysis can be performed (304) to reduce the dimensionality of the extracted feature vectors of each image.

The text-based image search service 110 coordinates with the Principal Component Analysis service 116 to perform the Principal Component Analysis on the extracted feature vectors to score the corresponding features (304). In some embodiments, Principal Component Analysis service 110 can be used to reduce the dimensionality of the approximately 2048 bit feature vector of each image by identifying significant content based features from the approximately 2048 bit feature vector. In some examples, reducing the dimensionality includes, but is not limited to performing a Principal Component Analysis (PCA) on the approximately 2048 bit feature vector for each image to receive a score of the significance of each of the 2048 features represented in the approximately 2048 bit feature vector for each image. Text-based image search service 110 can receive the output of the Principal Component Analysis and determine the features having the highest absolute score (scores are given in positive and negative values) which indicate their relative significance. The features having the highest absolute score can be retained by duplicate detection content service 110 and the rest discarded, thereby, duplicate detection content service 110 can truncate (204) an output feature vector from the Principal Component Analysis to yield the reduced-dimension textual representation for each image in the collection of images.

After the completion of the Principal Component Analysis, the text-based image search service 110 discards any feature having a score less than a threshold (306), and keeps the remaining features for the creation of the final textual representation of the image. In some embodiments, the features having a score with an absolute value more than the threshold will be kept for future use, while the rest of the features will be discarded. In some embodiments, a number of the extracted features for each image is approximately 2048, and the threshold is selected so that approximately 130 features remain.

The text-based image search service 110 then further simplifies the feature vectors by converting the scores for each remaining feature into a one or a zero. A one is assigned to the feature vector if its score is positive, a zero is assigned to the feature vector if its score is negative. This process is to derive the resulting textual representation as a sequence of positive or negative for all the remaining features.

In some embodiments, each of the remaining features includes a label and the assigned number for the corresponding remaining feature. Some example textual representations for one feature position can be shown as "A0" or "CS1." In these examples, "A" and "CS" are the assigned labels for the specific remaining feature, and the "0" and "1" are the binary number assigned to that remaining feature vector based on its Principal Component Analysis score. In the case that a feature has a score with an absolute value that is less than the threshold, the final textual representation will not include the feature in the textual representation. For example, assuming two images having two of the same extracted features, one image has both features scored above the threshold, while the other image has only one feature scored above the threshold. An example textual representations for the image with both features scored above the threshold can be "A0 CS1," while an example textual representations for the other image can be "A0." This is because the feature "CS" of the other image failed to score above the threshold, and the feature "CS" is omitted in the final textual representation of the other image.

In some embodiments, method 300 can also be utilized when the search input includes a collection of multiple images. For example, when a collection of multiple images is received as a search input, text-based image search service 110 first coordinates with the feature vector extraction service 112 to extract feature vectors for all of the input image files (302). The text-based image search service 110 then coordinates with the Principal Component Analysis service 116 to perform the Principal Component Analysis on the extracted feature vectors to score the corresponding features (304). After the scoring, the text-based image search service 110 discards any feature having a score less than a threshold (306), and assigns each of the remaining features with a one or zero. In this example, the threshold can be selected so that approximately 130 feature positions remain in the final textual representation, or the threshold can also be selected so that more than 130 features remain in the final textual representation.

By adjusting the threshold, the text-based image search Service 110 can adjust the detail represented in the textual representations of the images. The threshold can be optimized to provide an efficient text search that still provides good results. The lower the threshold, the greater the detail present in the textual representation for the images, but as the textual representation includes greater detail, the text search requires greater processing resources and memory. It has been determined that about 130 features yields the right balance between size and detail in the textual representations of the images.

The present technology of converting an image file into a textual representation provides several improvements over the current technology. First, text-based search engines can be used to search images based on a textual representation of their content. Second, this technology makes the image search more efficient by reducing the textual representation of the images to only a number of the most significant image features in identifying images with similar content. Third, the reduced size of the textual representation makes image search in a large scale, or search input with a collection of images manageable to some text-based search engines.

Figure 4:
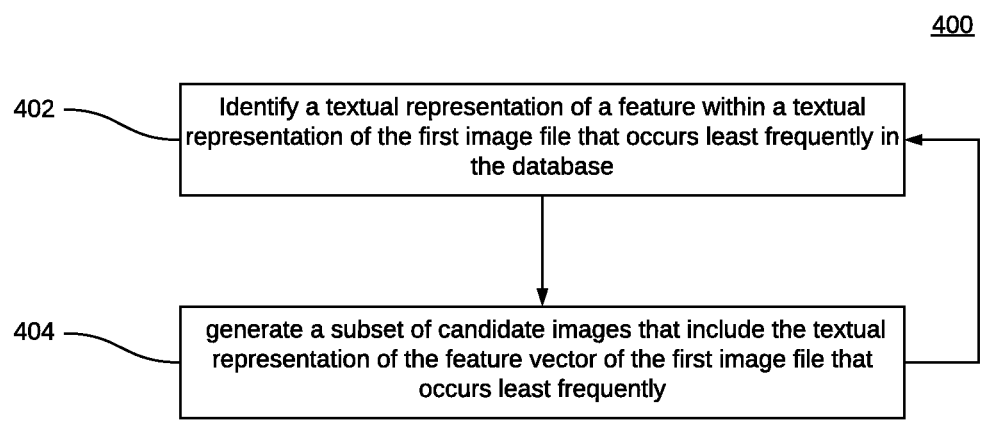
FIG. 4 illustrates an example method of comparing the textual representation of images to find relevant images in accordance with some aspects of the present technology.

FIG. 4 illustrates an example method of comparing the textual representation of images to find relevant images by text-based image search service 110 in accordance with some aspects of the present technology (400). Text-based image search service 110 identifies a first feature within a textual representation of the first image file (target of the search) that occurs least frequently in the database 104 containing the textual representations of the collection of images (402). Text-based image search service 110 can search the collection of images for textual representations containing the first feature to generate a subset of candidate images that may be relevant to the search target (504). Method 500 can be performed in a cycle with by iteratively identifying a next least frequently occurring feature in the textual representation of the search target (402) and searching the remaining candidate images for textual representations that also contain the next least frequently occurring feature and thus generating a smaller subset of candidate images (504). Method 500 can continue until all features in the textual representation of the search target have been searched or a small enough result set has been identified.

This approach of narrowing down search results is based on the discovery that Zipf's law also applies to image feature vectors of a large collection of images. In an example of natural languages, Zipf's law states that the frequency of any word is inversely proportional to its rank in the frequency table. Thus, such a characteristic of natural language has been utilized by some text-based search engines to search each word of a search query, starting from the least frequent word to the most frequent word of the search query to narrow down the search database fast. Because by doing this, the database to be searched will be narrowed down each round rather than search every word of the search query in the whole database randomly.

The present technology of narrowing down image search results utilizes Zipf's law's application in image feature vectors of a large collection of images. This technology provides several improvements over the current image search product, such as being more efficient and performing well in larger scale searchers, because each round of the search is performed within a much narrower scope of image data than the last round. With this technology, images can be sorted into more specific categories, and the results can be further utilized. For example, in a social media setting, images with the similar content can be grouped together, and later be used to analyze why certain images are more popular, and to predict whether a certain images can be popular based on this data.

Figure 5:
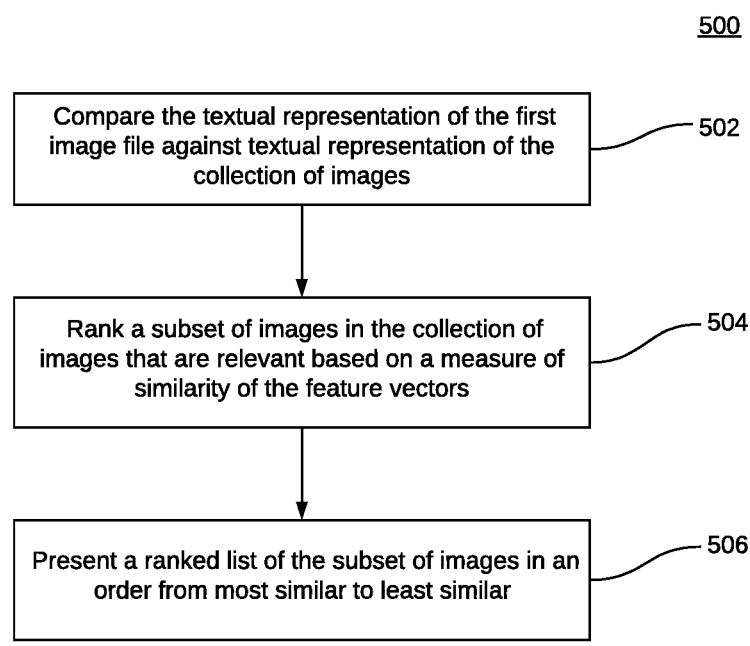
FIG. 5 illustrates an example method of searching for images using a text-optimized search engine, using content based textual representations in accordance with some aspects of the present technology.

FIG. 5 illustrates an example method of searching for images using a text-optimized search engine, using content based textual representations in accordance with some aspects of the present technology. The text-based image search service 110 compares the textual representation of the first image file against the textual representation of the collection of images to generate a subset of images that are relevant (502). In some embodiments, the textual representations of the first image file and the collection of the images are created based on extracted feature vectors for the first image file and the collection of the images. In some embodiment, the textual representations of the first image file and the collection of the images are created as described above with respect to FIG. 3. The process of comparing the textual representations has been addressed above in greater detail with respect to FIG. 4.

After generating the subset of images in the collection of images that are relevant, the text-based image search service 110 ranks the subset of images based on a measure of similarity to the full extracted feature vectors of the first image file (504). In some embodiments, similarity can be determined by plotting the feature vectors for the relevant images and the search target in an embedding space and determining a distance between the search target and the search results; the search results that are the closest distance to the search target can be ranked highest as being most similar.

Then, the text-based image search service 110 presents the ranked list of the subset of images (506). This list is in an order from the image that is the most similar to the full extracted feature vectors of the first image file, to the least similar image. In some embodiments, this list is the search result of the text-based image search.

While the above example and respective figures may be discussed with reference to each other, such references should be considered as examples, and should not be considered limiting of the present technology.

One or more systems, processes, and/or methods of this technology may utilize one or more machine learning systems, processes, and/or methods to help achieve the text-based image search. For example, the one or more machine learning systems, processes, and/or methods may be used to train the Principal Component Analysis (PCA) model described before.

Figure 6:
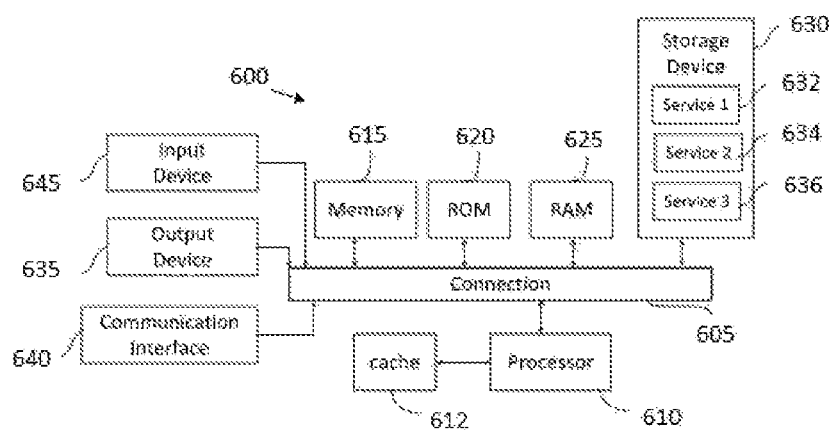
FIG. 6 illustrates an example of computing system in accordance with some aspects of the present technology.

FIG. 6 shows an example of computing system 600, which can be for example any computing device making up system 100, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A non-transitory computer readable medium comprising instructions stored thereon, the instructions cause at least one processor to:
   receive a first image file as a search input;
   convert the first image file into a textual representation of the first image file, wherein the textual representation includes a plurality features of the image file;
   generate a feature vector from the first image file including the plurality of features;
   perform a Principal component analysis on the extracted feature vector of the first image file to receive a score of the features including the plurality of features represented in the feature vector; and
   search a database of textual representations of a collection of images to identify textual representations associated with the collection of images that are relevant to the textual representation of the first image file, wherein the search is performed by a text-optimized search engine that is configured to initially search for one of the plurality of features of the image file that occurs infrequently in the database of textual representations.

2. The non-transitory computer readable medium of claim 1, the instructions to convert the first image file into a textual representation of the first image file further includes instructions to cause at least one processor to:
   generate a feature vector from the first image file including the plurality of features;
   perform a Principal component analysis on the extracted feature vector of the first image file to receive a score the features including the plurality of features represented in the feature vector.

3. The non-transitory computer readable medium of claim 2, wherein the instructions to convert the first image file into a textual representation of the first image file further includes instructions to cause at least one processor to:
   discard any feature in the feature vector having a score less than a threshold resulting in the plurality of features;
   assign the plurality of features with a zero or a one, corresponding to whether the score for that feature is positive or negative, after discarding the features having a score less than a threshold, wherein the positive scores are represented as a one, and the negative scores are represented as a zero;
   wherein the resulting textual representation comprises a sequence of feature positions for the plurality of features, wherein each of the feature positions is created based on the plurality of features remaining in the feature vector and the corresponding score.

4. The non-transitory computer readable medium of claim 3, wherein each of the feature positions comprises a label assigned to the plurality of features that had score greater than the threshold, and the assigned number for the corresponding remaining feature.

5. The non-transitory computer readable medium of claim 3, wherein a number of the extracted features for each image is approximately 2048, and the threshold is approximately 130 features.

6. The non-transitory computer readable medium of claim 1, wherein the instructions to search the database of textual representations of a collection of images to identify textual representations associated with the collection of images that are relevant to the textual representation of the first image file further includes instructions to cause at least one processor to:
  compare the textual representation of the first image file against textual representations of the collection of images to generate a subset of images that are relevant, wherein the textual representations of the first image file and the collection of the images are created based on extracted feature vectors from the first image file and the collection of the images;
  rank the subset of images in the collection of images that are relevant based on a measure of similarity to the feature vectors representing the first image file; and
  present a ranked list of the subset of images in order from most similar to least similar as results responsive to the search input.

7. The non-transitory computer readable medium of claim 6, wherein the instructions to compare the textual representation of the first image file against textual representation of the collection of images to generate a subset of images that are relevant further includes instructions to cause at least one processor to perform a first iteration of:
  wherein the one of the plurality of features that occurs infrequently in the database of textual representations is a first feature within a textual representation of the first image file which occurs least frequently within the textual representations of the collection of images;
  search the collection of images for textual representations containing the first feature to generate a subset of candidate images that are relevant to the first image file.

8. The non-transitory computer readable medium of claim 7, wherein the instructions to compare the textual representation of the first image file against textual representation of the collection of images to generate a subset of images that are relevant further includes instructions to cause at least one processor to perform a second iteration of:
  identify a next least frequently occurring feature within the textual representation of the first image file which occurs the next least frequently within the textual representations of the collection of images;
  search the collection of images for textual representations containing the next least frequently occurring feature to generate a further subset of candidate images that are relevant to the first image file.

9. The non-transitory computer readable medium of claim 1, wherein the search input further comprises textual representations of feature vectors of a plurality of images.

10. A method comprising:
  receiving a first image file as a search input;
  converting the first image file into a textual representation of the first image file, wherein the textual representation includes a plurality features of the image file;
  generate a feature vector from the first image file including the plurality of features;
  perform a Principal component analysis on the extracted feature vector of the first image file to receive a score of the features including the plurality of features represented in the feature vector; and
  searching, using a text-optimized search engine, a database of textual representations of a collection of images to identify textual representations associated with the collection of images that are relevant to the textual representation of the first image file.

11. The method of claim 10, the converting the first image file into a textual representation of the first image file further comprises:
  generating a feature vector from the first image file; and
  performing a Principal Component Analysis on the extracted feature vector of the first image file to receive a score of each of features represented in the feature vector.

12. The method of claim 11, the converting the first image file into a textual representation of the first image file further comprises:
  discarding any feature in the feature vector having a score less than a threshold; and
  assigning each remaining feature with a zero or a one, corresponding to whether the score for that feature is positive or negative, after discarding the features having a score less than a threshold, wherein the positive scores are represented as a one, and the negative scores are represented as a zero;
  wherein the resulting textual representation comprises a sequence of feature positions, wherein each of the feature positions is created based on the corresponding remaining feature vector and the corresponding score.

13. The method of claim 12, wherein each of the feature positions comprises a label assigned to each remaining feature that had score greater than the threshold, and the assigned number for the corresponding remaining feature.

14. The method of claim 12, wherein a number of the extracted feature for each image is approximately 2048, and the threshold is approximately 130 feature positions.

15. The method of claim 10, the searching, using a text-optimized search engine, a database of textual representations of a collection of images to identify textual representations associated with the collection of images that are relevant to the textual representation of the first image file further comprises:
  comparing the textual representation of the first image file against textual representation of the collection of images to generate a subset of images that are relevant, wherein the textual representations of the first image file and the collection of the images are created based on extracted feature vectors from the first image file and the collection of the images;
  ranking the subset of images in the collection of images that are relevant based on a measure of similarity to the feature vectors representing the first image file; and
  presenting a ranked list of the subset of images in order from most similar to least similar as results responsive to the search input.

16. The method of claim 15, the comparing the textual representation of the first image file against textual representation of the collection of images to generate a subset of images that are relevant further comprises a first iteration of:
  identifying a first feature within a textual representation of the first image file which occurs least frequently within the textual representations of the collection of images;
  searching the collection of images for textual representations containing the first feature to generate a subset of candidate images that is relevant to the first image file.

17. The method of claim 16, the comparing the textual representation of the first image file against textual representation of the collection of images to generate a subset of images that are relevant further comprises a second iteration of:
 identifying a next least frequently occurring feature within the textual representation of the first image file which occurs the next least frequently within the textual representations of the collection of images;
 searching the collection of images for textual representations containing the next least frequently occurring feature to generate a further subset of candidate images that is relevant to the first image file.

18. The method of claim 10, wherein the search input further comprises textual representations of feature vectors of a plurality of images.

* * * * *